United States Patent Office 2,873,279
Patented Feb. 10, 1959

2,873,279

HALOGENATION OF PHTHALOCYANINES

David I. Randall, New Vernon, and John Taras, Alpha, N. J., assignors to General Aniline & Film Corporation, New York, N. Y., a corporation of Delaware No Drawing. Application August 10, 1956
Serial No. 603,228

13 Claims. (Cl. 260—314.5)

This invention relates to coloring matters of the phthalocyanine series and more particularly to an improved process for the manufacture of halogenated phthalocyanines and to the brilliant coloring matters of unusual properties thus produced.

Phthalocyanines have been characterized as resonating heterocyclic structures in which four aromatic rings are combined by extra cyclic nitrogen atoms, the whole forming a very stable coordination complex with various metals, such as copper, iron, nickel, cobalt, etc. (see R. P. Linstead and others, Journal of the Chemical Society (London), 1934, pp. 1016–1039).

The halogenated (chloro, bromo) phthalocyanines, especially chlorinated copper phthalocyanines, make excellent green pigments possessing bright shades, high tinctorial strength, good opacity and outstanding resistance to exposure to light, heat, dilute acid, weak and strong alkalies and the organic solvents most commonly used in the application of pigments. As a result of these excellent pigment properties, chlorinated copper phthalocyanine has been used extensively for coloring paints, printing inks, plastics, lacquers, floor covering compositions, roofing granules, paper and the like.

The halogenated copper phthalocyanines can be represented by the formula

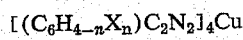

$$[(C_6H_{4-n}X_n)C_2N_2]_4Cu$$

where $n$ represents the number of halogen atoms substituted in each benzene ring, and X is halogen, i. e. chloro, bromo. Introduction of halogen atoms into the phthalocyanine molecule leads to progressively greener shades, i. e. products with increased halogen content. Thus the unchlorinated commercially important copper phthalocyanine blue can be finally converted into a yellowish-green pigment by substitution of most or all of the sixteen aromatic hydrogen atoms by chlorine atoms.

In the practice of the art heretofore, the manufacture of halogenated metal phthalocyanines has been accomplished by five principal processes:

(1) Synthesis of a phthalocyanine compound from halogenated intermediates (U. S. Patents 2,197,458, 2,647,127, 2,647,128 and 2,673,854).

(2) Synthesis of a phthalocyanine compound from non-halogenated initial material, isolating the color and subjecting same to halogenation in special media. The various media used have been nitrobenzene, molten phthalic anhydride or an aluminum chloride-sodium chloride melt (U. S. Patents 2,195,984, 2,214,469, 2,253,560, 2,247,752 and 2,276,860).

(3) Treating the synthesized, unhalogenated phthalocyanine with sulfur dichloride under elevated temperature and/or pressure (U. S. Patent 2,377,685).

(4) Treating the synthesized, unhalogenated phthalocyanine in the solid state with chlorine gas. This process utilizes the fluidized bed technique, the reaction being performed at high temperatures (U. S. Patent 2,586,598).

(5) Subjecting the synthesized, unhalogenated phthalocyanine to solution in chlorosulfonic acid followed by halogenation in this medium (U. S. Patent 2,662,085).

All of the above described processes suffer from serious drawbacks (e. g., acid pasting requirement) both quantitative and/or economical.

The first general method described above is limited in its applicability to the production of only lower chlorinated phthalocyanines. The method fails when it is used to prepare the fully chlorinated phthalocyanine. In the latter case, the yields are generally so low, of the order of 20–25% of theory, as to be prohibitive economically.

The second mentioned process, especially the process utilizing the aluminum chloride-sodium chloride melt, is the most preferred of all the processes heretofore disclosed (U. S. Patent 2,247,752). However, even this process suffers from serious drawbacks. The chlorination must be carefully controlled, not only to obtain the proper shade, but to prevent decomposition of the product. Furthermore the product produced by this method must be conditioned by an acid pasting treatment before it can be used as a pigment.

The third process requires expensive equipment. The color produced must be isolated and given a further acid pasting conditioning treatment before it can be used in pigment applications.

The fourth method requires special, expensive equipment and high temperatures. Further the color must not only be pretreated prior to chlorination but must be further conditioned by acid pasting after formation to be commercially useful.

The fifth method, although similar to the second, has the advantage of producing a product which is ready for application without further conditioning. However, this process suffers from several disadvantages that completely overcome its virtues. It is limited in capacity and requires large amounts of expensive catalysts (antimony salts, iodine). Also, it is exceedingly difficult, if not altogether impossible, to introduce more than 13 or possibly 14 chlorine atoms into the molecule. The desired yellowish green shade results only if more than 14 atoms of chlorine are introduced.

It is accordingly an object of this invention to provide an improved, practical process for the halogenation of phthalocyanine compounds in an economical manner. It is a further object of this invention to provide a new method for the halogenation of phthalocyanines which is facilitated and more readily controllable. Another object of this invention is to provide a process for producing halogenated phthalocyanines that need no further conditioning after isolation to make them commercially useful. Other objects and advantages will appear as the description proceeds.

The attainment of the above objects is made possible by the instant invention which comprises treating a phthalocyanine compound with a member selected from the group consisting of chlorine and bromine in a melt containing anhydrous aluminum chloride and an inorganic compounds selected from the group consisting of the compounds of sulfur with oxygen, halogens, and mixtures thereof at a temperature of about 60 to 200° C. The above defined process of this invention has the advantage of enabling halogenation at lower temperatures (below 200° C.) and can be conveniently carried out at atmospheric pressure. Because of the extreme fluidity of the melt at the temperatures involved, the temperature and degree of chlorination obtained is more easily controlled. The most important advantage of the instant process, due in large part to the extreme fluidity of the reaction mixture, resides in the ability of the reaction mixture to be drowned in water in known manner, preferably with agitation, to precipitate a green pigment which needs no further treatment to make it commercially useful. Thus, the precipitated pigment after drowning can be used directly as a presscake, or dried to a powder with or without known agents imparting softness, etc. to the product. This of course means that the costly acid pasting procedure previously found necessary may be entirely eliminated, resulting in great economies in process and product. Although the instant process may be employed to introduce any desired number of halogen atoms into the phthalocyanine molecule, it is highly advantageous when used to introduce more than 14 and up to 16 halogen atoms. Quite unexpectedly the products of the instant process have a shade that is desirably yellower than present commercial standards. In lithographic inks, the instant products also have a darker masstone (opacity). In view of this, it is surprising that enamel drawdowns have a higher degree of transparency than other similar products on the market.

The use of aluminum chloride is of course well known in the prior art to effect halogenation of phthalocyanine compounds. However, its use has been either (1) as a catalyst or halogen carrier, or (2) as a component of an eutectic mixture, the other component being usually a metal or alkali metal halide such as sodium chloride. In the instant process, the aluminum chloride is used in greater than catalytic amounts. The use of the aforementioned eutectic mixtures with metal or alkali metal halides never resulted in sufficient fluidity of the melt to enable a product of high tinctorial value to be obtained. In all such cases, ultimate tinctorial strength and brightness of shade could only be obtained by a subsequent acid pasting or milling treatment of the halogenated phthalocyanine obtained after drowning.

The exact mechanism or theoretical explanation by which the improved results of the instant process are obtained is not clearly understood, but it is believed that the aluminum chloride forms a complex with the above defined sulfur compounds, in which complex the phthalocyanine to be halogenated is extremely soluble. For example, aluminum chloride and sulfur dioxide form a liquid melt at 60 to 65° C. in which copper phthalocyanine is extremely soluble. Use of either the aluminum chloride or the above defined sulfur compounds alone to effect halogenation will not result in the same solubility properties or the improved results obtainable by the use of both components as required in the instant invention. Nor do either of the components alone result in such a fluid drowning as to render further conditioning of the pigment unnecessary.

The above defined sulfur compounds employed in the instant process are also known in the prior art for the halogenation of phthalocyanine compounds, having been used as diluents and halogenating agents using aluminum chloride as a catalyst, but under these conditions, higher temperatures and pressures were required. Even then, full chlorination could not be achieved readily, and the pigment still needed further conditioning, notably by acid pasting, to make it commercially useful. The preferred sulfur compounds for use in the instant process are thionyl chloride, sulfuryl chloride and especially sulfur dioxide. However, other compounds of sulfur with oxygen, halogens, and mixtures thereof may be employed as for example sulfur monobromide, the mono-, di- and tetrachlorides of sulfur, the sesqui-, tri-, hept- and tetraoxides of sulfur, sulfur monooxytetrachloride, sulfur trioxytetrachloride, sulfuryl pyrochloride, thionyl bromide, thionyl bromide chloride and the like. The sulfur compounds operative herein have the property of forming a fluid complex with aluminum chloride.

In carrying out the process of the instant invention, about 0.3 to 1.3 parts of the inorganic compound of sulfur with oxygen, halogen, or mixture thereof is employed for each part by weight of anhydrous aluminum chloride. The exact proportions necessary to produce a fluid melt will of course vary in each instance depending upon the particular sulfur compound employed, the phthalocyanine compound being treated, and the temperature of halogenation. Where the sulfur compound is a solid, it is preferred to form a melt containing the aluminum chloride, sulfur compound and phthalocyanine compound and then treat this reaction mixture with the desired amount of chlorine or bromine to obtain the desired degree of halogenation. Where the sulfur compound is gaseous, it is generally preferred to pass a sufficient amount thereof into the aluminum chloride to liquefy same, and then treat the phthalocyanine compound in the resulting liquid simultaneously with the sulfur compound and the halogen until the desired degree of halogenation is obtained.

Further improved results are obtained by employing a multi-stage process wherein the halogen in the first stage is added at a slow rate to the melt at temperatures below about 100° C., and the rate of introduction of halogen subsequently increased as the temperature of the melt rises above 100° C. Thus, chlorine gas may be passed through the melt at about 70° C. at a rate of about 2 to 4 grams per hour, and then, when the foaming and refluxing period has passed, and the temperature rises above 100° C., the rate of chlorine flow may be increased one or more times or gradually until the desired degree of halogenation is obtained. The time of the reaction is variable, completion thereof being ascertained by extracting small samples and drowning to observe shade changes. Care should be taken not to allow the temperature to rise above the prescribed limits since sublimation and resultant thickening of the melt may occur.

The halogenating agents employed in the instant process are elemental chlorine or bromine or mixtures thereof, in liquid or gaseous form. It will be understood that although it is preferred to add the halogenating agent gradually or by increments during the course of the reaction at a rate commensurate with its rate of consumption, the required amount of such agent, or an amount in excess thereof, may be added at once at the beginning of the reaction. Similarly, although an open reaction vessel may be used with advantage, the reaction may in some instances be desirably carried out in a closed vessel or under pressure.

The phthalocyanine compound to be halogenated may be metal free or may be any of the known metal phthalocyanines such as those of copper, cobalt, aluminum, iron, nickel, magnesium, lead, zinc, chromium, tin, and the like, and mixtures thereof. Such phthalocyanine compounds may already be partially halogenated or substituted by other groups inert to the conditions of the instant process. Only sufficient phthalocyanine compound should be employed which dissolves to produce a fluid melt. The solubility will of course depend upon the particular phthalocyanine, the particular melt, and the temperatures employed in each instance. In general, such amounts may range from about .05 to .25 part of phthalocyanine compound per part by weight of anhydrous aluminum chloride.

The following examples, in which parts are by weight unless otherwise indicated are illustrative of the instant invention and are not to be regarded as limitative. In all of these examples, the halogenation is carried out in an open system under atmospheric pressure, the unused and by-product gases being vented out of the system, and yields of over 90% are obtained.

*Example 1*

A five-neck flask is fitted with an agitator, thermometer, reflux bulb condenser, sulfur dioxide inlet tube and chlorine inlet tube. The flask is charged with 130 parts anhydrous aluminum chloride. A slow stream of sulfur dioxide is introduced. The temperature of the mix gradually rises to 55–60° C. as the melt becomes liquid. The sulfur dioxide stream is interrupted and there is now charged 20 parts copper phthalocyanine (ground to 80 mesh). The reaction is heated to 65° C. There is now introduced a simultaneous flow of both sulfur dioxide and chlorine gases at 65–70° C. After 10 minutes of flow the sulfur dioxide gas is cut off and the chlorination is continued alone for another fifty minutes while allowing the temperature to rise to 120° C. The rate of chlorination is so adjusted that a total of 12 parts of chlorine is run in during the first hour between the temperature range of 65° to 120° C.

The second phase of the chlorination is conducted between 120–180° C. For the first ten minutes of this period, the chlorine and sulfur dioxide gases are run in simultaneously. The sulfur dioxide is now turned off and the chlorination is continued for another fifty minutes at such a rate that when the temperature reaches 180° C. at the end of the hour period, a total of 36 parts of chlorine has been introduced.

The third and final phase of the chlorination is conducted between 175–180° C. Again for the first ten minutes of this final period the chlorine gas and the sulfur dioxide gas are run in together. The sulfur dioxide gas is now turned off and the chlorination is continued for the remaining fifty minutes at such a rate that at the conclusion of this period a total of 16 parts chlorine gas has been introduced. The chlorination is now stopped. The stream of sulfur dioxide is introduced for a period of ten minutes and then stopped. A total of 68 parts sulfur dioxide and 64 parts of chlorine is consumed.

The melt is now transferred into a previously heated dropping funnel and heated at such a rate that after five minutes the temperature has been readjusted to 175–180° C.

In order to obtain the desired temperature in this funnel, it was wrapped from the top of the bulb to the bottom tip with 20 ohm chromium steel wire. The wire, connected to a source of electricity, was covered with wet asbestos paste and glue. The funnel contents are then dried at 80–85° C. for sixteen hours. The tip opening of the funnel was constricted to 2 mm. diameter. To avoid clogging of the stop-cock the later was removed and the stem was resealed to the bulb. Flow of the melt was controlled by means of a closely fitting glass plunger rod inserted into the bottom of the bulb.

The melt is now drowned during the course of three minutes while its temperature is still 175–180° C. into 4000 parts water and 300 parts 37% hydrochloric acid with vigorous agitation. The drowning, although resulting in copious evolution of hydrogen chloride and sulfur dioxide gases, is not violent. The chlorinated copper phthalocyanine is filtered off, washed neutral and free of inorganic ions.

The product thus obtained is very finely divided and needs no further conditioning, as for example, by the customary acid pasting treatment to which all commercial brands of chlorinated copper phthalocyanine are currently subjected. Compared to commercial brands, this product yields a darker masstone and has a bleach test which is yellower and only slightly weaker. In enamel coating tests, it yields a shade which possesses a highly desirable transparency which the commercial products do not possess. The product contains 48.8% chlorine.

Example 2

This example is similar to Example 1, except that the following proportions of materials are used:

260 parts aluminum chloride
104 parts sulfur dioxide
30 parts copper phthalocyanine
88 parts chlorine The melt is then drowned in 8000 parts water containing 400 parts 37% hydrochloric acid in the manner already described in Example 1. Yield, 57 parts of chlorinated copper phthalocyanine whose chlorine content corresponds to 15–16 chlorine atoms per molecule.

Tinctorially the product without further conditioning is yellower, approximately as strong as chlorinated copper phthalocyanine of similar chlorine content prepared by chlorination in an aluminum chloride-sodium chloride melt (previously acid pasted).

Example 3

130 parts anhydrous aluminum chloride are placed in a flask. Sulfur dioxide gas is passed in until the melt becomes liquid. 25 parts copper phthalocyanine is added and 75 parts chlorine gas and 90 parts sulfur dioxide gas are passed in at a temperature range of 65–180° C. according to a schedule similar to that described in Example 1.

The bright green pigment obtained by drowning the chlorination melt in a fine stream is dilute mineral acid analyzes 48.39% chlorine by weight which corresponds to about 14.8 atoms chlorine per molecule.

The product requires no further acid pasting and tinctorially the brightness, strength and light fastness of the color are not impaired by the omission of such further conditioning.

Example 4

131 parts anhydrous aluminum chloride are placed in a flask. A slow stream of sulfur dioxide is passed into the reaction flask until the melt is liquid and during the entire course of the reaction. 20 parts of mono-chloro-copper phthalocyanine are now added and the temperature of the reaction is raised to 150° C. 59 parts chlorine gas are introduced at a steady rate during the course of three hours at 150–195° C.

The contents of the flask are added in a fine stream during a period of three minutes to 3000 parts of boiling water containing 200 parts of 37% hydrochloric acid with a high degree of agitation in the drowning vessel.

The green pigment precipitated is washed with 4000 parts of 1% hydrochloric acid, then with hot water until it is neutral. The filter cake is slurried in 3000 parts of 5% caustic soda at 90–95° C., filtered and washed neutral. A product of very small particle size is obtained resulting in excellent tinctorial properties of the pigment which does not require an acid pasting treatment.

Example 5

130 parts anhydrous aluminum chloride are placed in a flask. Enough sulfur dioxide is added to liquefy the melt. The temperature of the melt rises to 65° C. during this operation. 15 parts copper phthalocyanine are added and the temperature is adjusted to 65° C.

A steady stream of both sulfur dioxide and chlorine gases are introduced for one hour into the melt while the temperature is raised to 150° C. at the end of the hour. The chlorine stream is so adjusted that after this hour period a test sample drowned in dilute mineral acid compares favorably in shade to a standard of equal concentration also placed in mineral acid.

The chlorination melt, which is quite liquid at 150° C., is drowned in a fine stream during a period of about three minutes into a rapidly agitated solution of 6000 parts boiling water and 300 parts 37% hydrochloric acid.

The pigment is filtered, washed with dilute hydrochloric acid, then with hot water. The yield of pigment is over 95% of theory. The product contains 50.1% chlorine. It requires no further acid pasting, exhibiting a high degree of tinctorial brightness and strength.

Example 6

200 parts anhydrous aluminum chloride are placed in a flask. Sulfur dioxide gas is introduced and allowed to flow until the melt becomes liquid. 15 parts copper phthalocyanine are added.

A stream of sulfur dioxide and a stream of chlorine gas are run in between 65° C. and 200° C. until a sample of the melt indicates completion of the chlorination.

The melt at 200° C. is a thin liquid and can be readily poured in a very fine liquid stream into a rapidly agitated solution of 6000 parts boiling water and 300 parts concentrated (37%) hydrochloric acid. After filtering and washing in the usual manner a very finely divided product is obtained possessing excellent tinctorial and light fastness properties.

Example 7

131 parts anhydrous aluminum chloride are placed in a flask. A stream of sulfur dioxide is passed into the flask until the melt is liquid. 15 parts copper phthalocyanine and 5 parts mono-chloro-copper phthalocyanine are added.

A stream of sulfur dioxide and of chlorine gas are passed through the reaction melt according to the procedure described in Example 1. However, the chlorination is stopped after a half hour in the final period at 180° C. The pigment is precipitated in a finely divided form by the drowning technique described in Example 1.

The product contains 41.4% chlorine and is duller than that described in Example 1. Acid pasting does not improve the quality of this product as regards strength and shade.

Example 8

The procedure is the same as that described in Example 1 but the entire chlorination is accomplished at 180–185° C. This procedure requires a substantially greater amount of chlorine gas to achieve the formation of the product described in Example 1.

Example 9

A flask is charged with 130 parts anhydrous aluminum chloride, 160 parts sulfuryl chloride and 15 parts copper phthalocyanine.

The temperature of the reaction is raised to 175–180° C. in one hour and held at 175–180° C. for one hour while passing 20 parts chlorine gas into the melt.

The reaction melt is poured in a fine, steady stream into a vigorously agitated solution of 4000 parts hot water (65° C.) and 200 parts 37% hydrochloric acid.

The suspension containing the pigment is filtered and washed neutral and free of inorganic salt. The yield of bright green pigment is quantitative when considered as polychlorinated copper phthalocyanine, the chlorine content analyzing 48.6%. The product has a darker masstone, approximately equal in strength and a trace yellower than a copper phthalocyanine polychlorinated to the same extent in an aluminum chloride-sodium chloride melt and then acid pasted.

Example 10

15 parts copper phthalocyanine and 120 parts sulfuryl chloride are introduced into a flask. While agitating gently 130 parts anhydrous aluminum chloride are slowly dusted into the flask. The temperature of the reaction is raised to 180° C. over a period of one hour and held at 175–180° C. for one hour during which period 35 parts of chlorine gas are passed through the charge.

The chlorination melt is jet precipitated to insure turbulent flow of the acid solution during the drowning. The precipitated pigment, obtained in a very fine state of subsidivision, is filtered and washed neutral. When tested against the present commercial standard, the chlorinated copper phthalocyanine product (chlorine content =48.7%) is slightly stronger, slightly yellower in shade and superior in masstone.

Example 11

100 parts anhydrous aluminum chloride and 100 parts sulfuryl chloride are placed in a flask. The flask is heated to 65° C. and there are added 20 parts copper phthalocyanine.

A stream of sulfur dioxide is passed into the flask. During the course of three hours 40 parts of chlorine gas are passed into the chlorination mixture while allowing the temperature to rise to 185° C.

The melt is drowned in the manner described in Example 1.

Analysis indicates that the chlorinated copper phthalocyanine has a chlorine content of 48.2% chlorine by weight which corresponds to about 14.8 atoms per molecule. The product is a very bright green pigment possessing excellent tinctorial and light fasteness properties. These properties are not improved to any extent by further acid pasting.

Example 12

A flask is charge with 120 parts anhydrous aluminum chloride, 150 parts thionyl chloride, and 26 parts copper phthalocyanine.

The contents of the flask are stirred and heated to 170–175° C. while passing 24 parts chlorine gas into the melt. The period of the chlorinaion requires one and a half hours. The fluid melt is drowned in a fine stream into 6000 parts of hot water while agitating the drowning medium rapidly.

The pigment is filtered, washed neutral and free of inorganic salts.

Analysis shows that the pigment has a chlorine content of 48.2%. The pigment is tested against commercial standards and the results indicate that it requires no acid pasting to exhibit its full strength and superior masstone. Further the pigment has a desired shade of green yellower than the commercial standards.

Example 13

A flask is charged with 100 parts anhydrous aluminum chloride, 100 parts thionyl chloride and 15 parts copper phthalocyanine. The flask is heated to 50° C. and there is added at 50° C. 66 parts bromine. The temperature is increased to 115–120° C. and held there for a period of 1½ hours.

The melt is drowned in a fine stream into a rapidly stirred solution of 3000 parts water and 200 parts 37% hydrochloric acid.

The pigment is filtered and washed neutral.

Analysis shows that the product has a bromine content of 59.9% which corresponds to about 13 atoms of bromine and a chlorine content of 2.1% equal to 2.0 chlorine atoms. This result is unusual and unpredictable for nowhere in the art is there reference to a product containing more than 8 bromine atoms without resorting to high pressure and/or high temperature techniques. The tinctorial properties can not be improved by acid pasting.

Example 14

Example 13 is repeated except that aluminum phthalocyanine is substituted for the copper phthalocyanine. The product contains 51.1% bromine and 3.8% chlorine.

Acid pasting of this product does not improve the tinctorial strength.

Example 15

A flask is charged with 130 parts anhydrous aluminum chloride. A stream of sulfur dioxide is passed into the flask until the melt becomes liquid at a temperature of about 65° C. 15 parts cobalt phthalocyanine are added.

Streams of sulfur dioxide and chlorine gas are passed through the melt in the manner and accordingly to the procedure described in Example 1.

The chlorinated cobalt phthalocyanine is bluish-green in shade when used as a pigment in lithographic inks. Its analysis indicates 13–14 chlorine atoms per molecule.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A process comprising treating a phthalocyanine compound selected from the group consisting of phthalocyanine and metallic phthalocyanines with elemental chlorine in a melt consisting of aluminum chloride and, for each part theerof, about 0.3 to 1.3 parts of an inorganic compound of sulfur selected from the group consisting of sulfur dioxide, thionyl chloride and sulfuryl chloride and mixtures thereof at a temperature of about 60 to 200° C. until more than 14 and up to 16 chlorine atoms have been introduced into said phthalocyanine compound.

2. A process as defined in claim 1 wherein said phthalocyanine compound is a metal free phthalocyanine compound.

3. A process as defined in claim 1 wherein said phthalocyanine compound is a metal phthalocyanine compound.

4. A process as defined in claim 3 wherein said phthalocyanine compound is copper phthalocyanine.

5. A process as defined in claim 3 wherein said phthalocyamine compound is aluminum phthalocyanine.

6. A process as defined in claim 3 wherein said phthalocyanine is cobalt phthalocyanine.

7. A process as defined in claim 1 wherein said inorganic compound of sulfur is sulfur dioxide.

8. A process as defined in claim 1 wherein said inorganic compound of sulfur is thionyl chloride.

9. A process as defined in claim 1 wherein said inorganic compound of sulfur is sulfuryl chloride.

10. A process as defined in claim 1 wherein said phthalocyanine compound is copper phthalocyanine and said inorganic compound of sulfur is sulfur dioxide.

11. A process as defined in claim 1 wherein said phthalocyanine compound is copper phthalocyanine and said inorganic compound of sulfur is sulfuryl chloride 12. A process as defined in claim 1 wherein said phthalocyanine compound is copper phthalocyanine and said inorganic compound of sulfur is thionyl chloride.

13. A process as defined in claim 1 wherein said phthalocyanine compound is cobalt phthalocyanine and said inorganic compound of sulfur is sulfur dioxide.

References Cited in the file of this patent

UNITED STATES PATENTS

| | | |
|---|---|---|
| 2,214,469 | Linstead et al | Sept. 10, 1940 |
| 2,227,628 | Calcott | Jan. 7, 1941 |
| 2,247,752 | Fox | July 1, 1941 |
| 2,253,560 | Detrick et al. | Aug. 26, 1941 |
| 2,276,860 | Nieman et al. | Mar. 17, 1942 |
| 2,377,685 | Fox et al. | June 5, 1945 |
| 2,435,307 | Haddock et al. | Feb. 3, 1948 |
| 2,586,598 | Barnhart et al. | Feb. 12, 1952 |
| 2,662,085 | Holtzman et al. | Dec. 8, 1953 |

OTHER REFERENCES

Jour. Soc. Dyers and Colourists, March 1945, page 71.

UNITED STATES PATENT OFFICE
CERTIFICATE OF CORRECTION

Patent No. 2,873,279 February 10, 1959

David I. Randall et al.

It is hereby certified that error appears in the printed specification of the above numbered patent requiring correction and that the said Letters Patent should read as corrected below.

Column 6, line 16, for "stream is" read -- stream in --; column 8, line 11, Example 12, for "charge" read -- charged --; line 16, for "chlorinaion" read -- chlorination --; column 9, line 3, for "theerof" read -- thereof --.

Signed and sealed this 17th day of November 1959.

(SEAL)
Attest:

KARL H. AXLINE
Attesting Officer

ROBERT C. WATSON
Commissioner of Patents